Nov. 28, 1950

C. D. HANSCOM 2,531,624

SELECTIVE SIGNALING SYSTEM

Filed May 1, 1947

INVENTOR
C. D. HANSCOM
BY *P. C. Smith*
ATTORNEY

Patented Nov. 28, 1950

2,531,624

UNITED STATES PATENT OFFICE 2,531,624

SELECTIVE SIGNALING SYSTEM

Clarence D. Hanscom, Denville, N. J., assignor to Bell Telephone Laboratories, Incorporated, New York, N. Y., a corporation of New York Application May 1, 1947, Serial No. 745,309

6 Claims. (Cl. 179—18)

This invention relates generally to automatic telephone systems and in more particular to selector means employed therein and utilizing the well-known principle of enabling radiant energy to make the selections.

Heretofore systems have been provided in which a connection from one subscriber's line to any one of a plurality of other subscribers' lines has been established by deflecting a beam of radiant energy to select a given line to be connected. These connections have been by way of the actual beam of energy or have been exclusive of said beam and merely established and controlled thereby. Transmission of intelligence over such beams of energy, in some cases such as cathode ray tube beams of electrons, has been effected by modulation thereof by voice or other currents or by subsidiary minute deflections of said beam to effect displacement modulation of the target areas. In other cases the beams of energy, electron or light energy, have been used merely to energize or activate or enable a normally inactive or inoperable serial element of the circuit to be enabled. Such prior art is exemplified by ionization of gas discharge devices serial to the circuit to be enabled or selected, said devices precluding transmission over said circuit when deionized or deenergized. Beams of light have also been employed to activate photosensitive elements serial to the circuits or circuit to be selected.

It is the main object of the present invention to provide a plurality of resistance elements of negative temperature coefficient of resistance and individually serial to each circuit to be selected, said resistances normally being of such electrical parameter that the circuit associated therewith is inoperable, and to control a beam of energy, such as a cathode ray tube beam of electrons, in such a manner that it may select one of a plurality of said resistance elements and raise the temperature thereof to thereby lower the electrical parameter of said element to a magnitude which will make its associated circuit operable.

The invention is disclosed herein by means of illustrating part of an automatic telephone system wherein a cathode ray tube is employed as a selector. The electron beam of the tube is deflected in discrete steps in accordance with the dialed number of a called subscriber and said subscriber's line circuit has serial therewith a thermistor which is arranged as one of a number of targets for said beam. The thermistor is a resistance element whose electrical resistance has a negative temperature coefficient whereby under normal conditions its resistance is sufficiently high so that the said called subscriber's line circuit appearance at any other subscriber's station in the system is disabled. However, when said electron beam at one of the other stations is stepped so as to impinge on the target area for said called line, the electron current comprising said beam is passed through a heating element to effect a rise in temperature of said thermistor, whereupon the resistance thereof drops to a magnitude which enables the called circuit appearance at said calling station. The beam of electrons thereby controls and enables the transmission path without necessitating that it be a part thereof.

Other features of the invention will be apparent from subsequent detailed descriptions of the disclosed embodiment of the invention. General descriptions of the figures comprising the drawing which is a part of said disclosure are as follows.

Figures 1, 2:
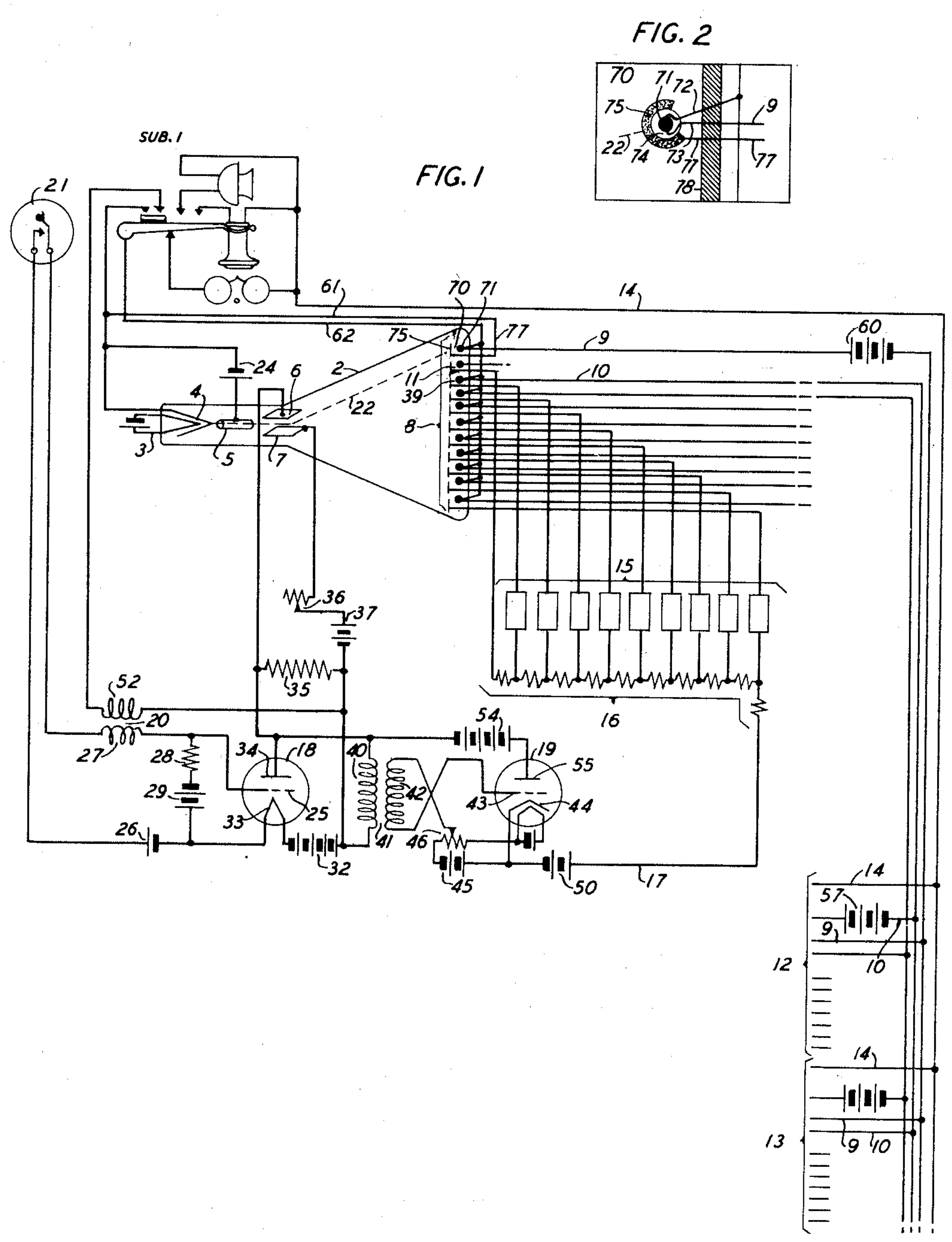
Fig. 1 shows a calling subscriber's line and a cathode ray tube used as the selector and arranged in accordance with the present invention.
Fig. 2 is a magnified illustration of the general structure of a thermistor suitable for realizing the utility of said invention as applied to the circuit of Fig. 1.

Referring now to the drawing, a subscriber's substation has been shown at 1 with the line having serial therewith a thermistor 70 comprising part of a target area of the cathode ray tube 2 which tube is provided with the usual filament 3 connected to a suitable source of current for the production of an electron beam through the tube. This beam is employed as the selecting and controlling means but not as a path for talking current as will hereinafter be described. The cathode element 4 is connected to the subscriber's line and an anode 5 is provided to control and concentrate the beam of electrons as is well known in the art. The battery 24 is provided to impress a positive potential on anode 5 with respect to cathode 4. A pair of deflection plates 6 and 7 is provided in the tube in any well-known manner to deflect the beam onto the target areas shown located at the end of the tube and collectively marked with the numeral 8. To these target areas are connected individual conductors such as 9 and 10. The first conductor 9 represents one conductor of the first subscriber's line and the remaining conductors lead to other equipments of this kind for other subscribers' lines and are equally spaced with respect to each other, except for the distance between the conductor 9 and the second conductor 10. This distance represents, if the subscriber at 1 is considered as the first subscriber in a group of ten, two spaces so that when the beam is deflected to select the second subscriber, it must be deflected two steps. The first step will point the beam onto a target 11 which is provided for holding the beam between pulses as will hereinafter be described. The corresponding targets for the second subscriber terminate in the group designated with the reference character 12 and the corresponding targets for a third subscriber terminate in the group designated with the number 13. Another conductor 14 is common to all groups of conductors leading to all of the subscriber's equipments.

The individual subscriber's conductors as, for example, the group 8 terminating at the first subscriber's equipment are connected to individual filters marked as a group with the numeral 15 and provided to prevent voice currents from passing through the resistances 16 to the conductor 17 which is employed, as will hereinafter be described, in connection with the operations of the circuits.

Two discharge tubes 18 and 19 are connected through various circuits including sources of potentials and an induction coil 20, one winding of which is connected to a dial 21 for the sending of the impulses to deflect the beam to the proper terminal in the tube 2. The tube 19 may be of the gas-filled type, so that the anode discharge current continues to flow following the removal of the input signal.

The circuit shown in Fig. 1 is substantially the same circuit as disclosed in my Patent 2,224,677, granted December 10, 1940. This latter patent fully discloses and claims the control circuits associated with the electron beam of the cathode ray tube 2, filters 15, and discharge tubes 18 and 19 of Fig. 1 therein. Except as modified by the provision of thermistors, such as 70, and circuit functions incident thereto, this disclosure is substantially the same as that of the above referenced patent.

Before describing the operation of the circuit of Fig. 1 the target or target area 70 shown magnified in Fig. 2 will be described. The target 70 comprises a thermistor bead 71 having two terminals 72 and 73 attached thereto and sealed inside of a globular mass of electrically, but not thermally, insulating material 74, such as glass, the said globule 74 having on the outer surface thereof a layer of high resistance material 75, such as a thin layer of metal. The target 70 is held in position by means of terminals 72 and 73 and control wire 77 all of which elements are sealed in the wall 78 of cathode ray tube 2 of which the cathode ray beam 22 is indicated in Fig. 2. The normal resistance of the bead 71 is so high that the circuit in which it is a serial element cannot function. However, when beam 22 impinges upon the target 70 the electron current passes through resistance 75 and control wire 77 to the control circuit or other circuits, and in passing through resistance 75 creates heat which raises the temperature of bead 71. Some effective heat will be derived from the bombardment effect of beam 22 impinging upon the coating 75. With a rise in the temperature the resistance of bead 71 decreases to enable functioning of its associated circuit. The electron beam 22 forms no part of the transmission circuit as is readily seen. Patent 2,332,596 to G. L. Pearson, granted October 26, 1943 discloses a thermistor construction which may be applied as above described.

A detailed description will now be made of the operation of this system in the selecting and establishing of a connection from the subscriber at 1 to one of the other nine of the group of ten subscribers. It should be noted that normally the electrons emitted from the cathode 4 provide a cathode ray beam 22 which is controlled by the anode 5 and normally maintained deflected by the potential difference between plates 6 and 7 to strike the target 70 so that calls incoming to subscriber 1 may pass over the circuit having target 70 as a serial element as will hereinafter be described. With this in mind, if the subscriber at 1 removes his receiver from its switchhook, he closes the circuits necessary to control the beam to establish a talking connection as will be described. When the subscriber operates his dial 21 by closing a connection between the pulse contacts, it will be noted that on the first impulse the potential on the grid 25 of the tube 18 will be changed to become less negative due to the connection of the battery 26 through the secondary winding 27 of the induction coil 20 across the resistance 28 and battery 29. This causes current to flow through the tube 18 over the output circuit from battery 32, filament 33, plate 34, resistance 35, back to battery 32. It will be observed that it is the connection through the potentiometer 36, the battery 37, and resistance 35 that normally maintains a potential difference between the plates 6 and 7 to maintain the beam 22 on target 70. On the other hand, on the establishing of the circuit through the output circuit of tube 18, the potential between plates 6 and 7 is changed so that the potential on plate 6 becomes less positive in relation to the potential on plate 7. This change is sufficient to deflect the beam from the target 70 one step downwardly to strike the target 11. No selective connection will be established by the beam at this time as it takes two impulses to establish a connection to target 39 for establishing a connection to the second subscriber in the group of ten.

It should be explained at this point how the beam is maintained on a terminal after having been once set. The operations in this respect are as follows: A current through the output circuit of tube 18 also flows through the primary winding 40 of the induction coil 41. This causes a momentary impulse of current to flow through the secondary winding 42 of this induction coil 41 which has the effect of making the grid 43 less negative in relation to the potential of cathode 44 as normally established by the battery 45 and potentiometer 46 in parallel and the connection through the secondary winding 42 of the induction coil 41 between the cathode 44 and the grid 43. This momentary change of potential between these elements causes a current to flow through the output circuit of the tube for maintaining the potential difference now established between the plates 6 and 7 as follows: From cathode 44, battery 50, conductor 17, resistances 16, resistance coating (75 of Fig. 2) of the second target 11, beam 22, element 4, contacts on the switchhook of subscriber 1, primary winding 52 of induction coil 20, resistance 35, battery 54, plate 55, back to cathode 44. As the plates 6 and 7 are connected to opposite sides of resistance 35, the potential difference established between these plates will now be maintained by this circuit through resistances 16 so that the beam will be held on the target 11. The current through this circuit also establishes through the circuit including winding 27 of the inductance coil 20, a momentary impulse which is in opposition to the current passed through this circuit by the closing of the contacts at dial 21 and therefore terminates the pulse established by the contacts at 21 through the output circuit of tube 18. Thus the impulse that causes the beam to step is quenched immediately to obviate the possibility of moving the beam a second step accidentally. The circuits now remain in this condition so that beam 22 is held on target 11 until the next impulse is transmitted by the dial contacts.

When this takes place, that is, when the contacts of dial 21 are again closed, the potential difference between the plates 6 and 7 is again changed, and thus causes the beam to be deflected to strike target 39 whereupon the above-mentioned circuit through the tube 19 and resistances 16 is closed with the exception that a portion of this resistance is eliminated so that a beam will now be maintained on this terminal until the next impulse is transmitted. The second impulse is extinguished by the momentary impulse through the winding 27. These operations are then repeated if additional impulses are sent and the potential on plate 6 is made less and less positive as the resistance through the circuit for maintaining the potentials decreases as additional units of the group 16 are eliminated.

The line potential filters shown at 15 are as stated for the purpose of preventing talking current from disturbing the holding circuits. There is one of these filters inserted in each line between the resistances 16 and the terminals associated therewith.

If it is assumed that only two impulses are sent, the beam will remain on target 39. The electron current in passing through the resistance coating (75 of Fig. 2) of target 39 will heat said resistance and this heat will raise the temperature of the thermistor bead (71 of Fig. 2) of target 39. The resistance of the bead will drop and effectively complete a circuit which may be traced over the common conductor 14, the subscriber's telephone set 1, conductor 62, target 39 and the conductor 10, thus causing the selection of the second subscriber. This circuit is continued over the conductor 10 through talking battery 57. The conductor 10 terminates in the second subscriber's cathode ray tube at the first target corresponding to target 70 in tube 2. From there it is extended by a conductor corresponding to conductor 62 through the called subscriber's ringer back over the common conductor 14. This causes the called subscriber's ringer to operate and when the called subscriber answers, the ringer is eliminated and a connection is completed for talking between the first and second subscribers. If the second subscriber had called the first subscriber, he would have dialed one impulse and established a connection by means of his tube, over conductor 9 of group 12, through talking battery 60, target 70, conductor 62, subscriber's ringer at station 1, common conductor 14, back to the second subscriber's equipment, over the conductor corresponding to 62 and the target of the tube corresponding to target 11 of tube 2 back to conductor 9 of group 12. In a similar manner connections may be established from any subscriber to any other in the system disclosed in this drawing which comprises as stated a group of ten subscribers' lines.

The actual wiring arrangement of the subscriber's substation 1 and of the anode 5 of the tube 2 is modified slightly from the disclosure in Patent 2,224,677, this being done merely to isolate the tube 2, beam 22 thereof and associated control circuits from the talking path. A conductor 61 has been provided to permit a return or leakage path for the electron current which impinges upon the resistance coating (75 of Fig. 2) of target 70 in the normal position of beam 22.

There will be numerous embodiments of this invention suggested to those skilled in the art and since it is not intended that the invention be limited to the particular embodiment shown herein, claims are appended which alone define the scope of this invention.

What is claimed is:

1. A plurality of telephone circuits each having serial therewith a source of current and a common calling substation and a different called substation and a different resistance element, each of said resistance elements having a negative temperature coefficient of resistance, the normal resistances of said elements being such that the respective circuits including the respective elements conduct insufficient current to permit said calling substation to signal any one of said called substations over the associated circuit, a stream of electrons not included in any of said circuits, circuit means under the control of said calling substation for directing said stream of electrons at one of said resistance elements to change the temperature of and thus the resistance of said one element thereby to permit the serial circuit associated therewith including the selected element to conduct sufficient current to permit said calling substation to signal only the called substation serially included in said circuit.

2. A plurality of telephone circuits each having serial therewith a source of current and a common calling substation and a different called substation and a different resistance element, each of said resistance elements having a negative temperature coefficient of resistance, the normal resistances of said elements being sufficiently high such that the respective circuits including the respective elements conduct insufficient current to permit said calling substation to signal any one of said called substations over the associated circuit, a heating element associated with each of said resistance elements, said heating element being electrically insulated from said resistance element and in thermally conductive relation thereto, a stream of electrons not included in any of said circuits, circuit means under the control of said calling substation for directing said stream of electrons at one of said heating elements to increase the amount of heat produced by said one heating element, said increase of heat effective to increase the temperature of and thus decrease the resistance of the associated resistance element thereby to permit the serial circuit associated therewith including the selected resistance element to conduct sufficient current to permit said calling subscriber to signal only the called substation serially included in said circuit.

3. A plurality of telephone circuits each having serial therewith a source of current and a common calling substation and a different called substation and a different resistance element, each of said resistance elements having a negative temperature cofficient of resistance, the normal resistances of said element being sufficiently high such that the respective circuits including the respective resistance elements conduct insufficient current to permit said calling substation to signal any of said called substations over the associated circuit, each of said resistance elements having thereon a heat productive resistance coating, said coating being electrically insulated from said element and in thermally conductive relation thereto, a stream of electrons not included in any of said circuits, circuit means under the control of said calling substation for directing said stream of electrons to select and to impinge upon and to be conducted by one of said heat productive resistance coatings, said selected heat productive resistance coating, under the action of said electrons impinging thereon and being conducted therethrough, increasing in temperature to in turn increase the temperature of the resistance element coated thereby, whereupon the resistance of said element decreases thereby to permit the serial circuit associated therewith including the selected element to conduct sufficient current to permit said calling substation to signal only the called substation serially included in said circuit.

4. A plurality of electrical circuits each having a resistance element serial therewith, said resistance elements having negative temperature coefficients of resistance, the normal resistance of each of said resistance elements being such that the respective circuits including the respective resistance elements conduct insufficient current and thereby are disabled, each of said resistance elements having a resistance coating thereon, said coating being electrically insulated from said element and in thermally conductive relation thereto, a stream of electrons not included in any of said circuits, circuit control means for directing said stream of electrons to impinge upon and be conducted by only one of said resistance coatings at any one time to change the temperature of said one resistance coating, and means whereby said circuit control means is selectively controlled, said change effective to alter the temperature of and thus the resistance of the associated resistance element thereby to permit only the associated selected circuit including said associated resistance element to conduct sufficient current to become enabled.

5. A plurality of electrical circuits each having a resistance element serial therewith, said resistance elements having negative temperature coefficients of resistance, the normal resistance of each of said resistance elements being sufficiently high such that the respective circuits including the respective resistance elements conduct insufficient current and thereby are disabled, each of said resistance elements having a resistance coating thereon, said coating being electrically insulated from said element and in thermally conductive relation thereto, a stream of electrons not included in any of said circuits, circuit control means for directing said stream of electrons to impinge upon and be conducted by only one of said resistance coatings at any one time to increase the temperature of said one resistance coating, and means whereby said circuit control means is selectively controlled, said increase effective to increase the temperature of and thus decrease the resistance of the associated resistance element thereby to permit only the associated selected circuit including said associated resistance element to conduct sufficient current to become enabled.

6. A plurality of electrical circuits each having a resistance element serial therewith, said resistance elements having negative temperature coefficients of resistance, the normal resistances of said elements being sufficiently high such that the respective circuits including the respective resistance elements conduct insufficient current and thereby are disabled, each of said resistance elements having thereon a heat productive resistance coating, said coating being electrically insulated from said element and in thermally conductive relation thereto, a stream of electrons not included in any of said circuits, circuit control means for directing said stream of electrons to select and to impinge upon and to be conducted by only one of said heat productive resistance coatings at any one time, and means whereby said circuit control means is selectively controlled, said selected heat productive resistance coating, under the action of said electrons impinging thereupon and being conducted thereby, increasing in temperature to in turn increase the temperature of the resistance element coated thereby, whereupon the resistance of said resistance element decreases thereby to permit only said selected circuit including said resistance element to conduct sufficient current to become enabled.

CLARENCE D. HANSCOM.

REFERENCES CITED

The following references are of record in the file of this patent:

UNITED STATES PATENTS

| Number | Name | Date |
|---|---|---|
| 2,224,677 | Hanscom | Dec. 10, 1940 |
| 2,228,388 | Farnsworth | Jan. 14, 1941 |
| 2,239,769 | Batchelor | Apr. 29, 1941 |
| 2,357,922 | Ziebolz et al. | Sept. 12, 1944 |
| 2,429,933 | Gibson | Oct. 28, 1947 |